US011505202B2

(12) United States Patent
Zhang et al.

(10) Patent No.: US 11,505,202 B2
(45) Date of Patent: Nov. 22, 2022

(54) USER-ASSISTED MAINTENANCE OF AUTONOMOUS VEHICLE FLEET

(71) Applicant: GM Cruise Holdings LLC, San Francisco, CA (US)

(72) Inventors: Yifei Zhang, San Francisco, CA (US); Jeffrey Shaw, San Francisco, CA (US); Alexander Willem Gerrese, San Francisco, CA (US); Jeremy Stephen Juel, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 361 days.

(21) Appl. No.: 16/907,505

(22) Filed: Jun. 22, 2020

(65) Prior Publication Data

US 2021/0394774 A1    Dec. 23, 2021

(51) Int. Cl.
*B60W 50/14* (2020.01)
*G05D 1/00* (2006.01)
*B60S 1/56* (2006.01)
*B60R 11/04* (2006.01)

(52) U.S. Cl.
CPC ............. *B60W 50/14* (2013.01); *B60R 11/04* (2013.01); *B60S 1/56* (2013.01); *G05D 1/0088* (2013.01); *B60W 2050/146* (2013.01); *G05D 2201/0213* (2013.01)

(58) Field of Classification Search
CPC ................ H04N 7/18; B60W 2050/14; B60W 2050/146; B60W 50/00; B60W 50/14; B60W 50/0019; B60W 50/0026; B60W 50/0089; B60W 50/0097; B60W 50/032; B60W 2420/42; B60W 2420/52; B60W 2530/00; B60W 2530/14; B60W 2550/00; B60W 2550/10; G05D 1/00; G05D 1/0088; G05D 2201/00; G05D 2201/02; G05D 2201/0203; G05D 2201/0213; B60S 1/00; B60S 1/02; B60S 1/04; B60S 1/0411; B60S 1/56; B60S 3/00; B60S 3/041; B60S 5/00; B60R 11/04; B60R 1/00; G06T 2207/00; G06T 2207/20081; B64C 2201/00
See application file for complete search history.

(56) References Cited

U.S. PATENT DOCUMENTS

| | | | |
|---|---|---|---|
| 2016/0129999 A1* | 5/2016 | Mays | B64C 39/024 701/2 |
| 2017/0210353 A1* | 7/2017 | Stauffer | B60N 2/58 |
| 2020/0047717 A1* | 2/2020 | Frederick | G02B 27/0006 |
| 2021/0107040 A1* | 4/2021 | Violetta | B08B 3/041 |

* cited by examiner

*Primary Examiner* — Anthony R Jimenez
(74) *Attorney, Agent, or Firm* — Akona IP PC (57) ABSTRACT

An autonomous vehicle (AV) maintenance system engages a user of an AV to assist in maintenance tasks. A sensor interface receives data captured by a sensor of the AV. An issue detector processes the sensor data to detect an issue in the AV. A user interface module instructs a user to perform a maintenance task addressing the detected issue. A verification module verifies that the user successfully completed the maintenance task.

20 Claims, 5 Drawing Sheets

USER-ASSISTED MAINTENANCE OF AUTONOMOUS VEHICLE FLEET

TECHNICAL FIELD OF THE DISCLOSURE

The present disclosure relates generally to autonomous vehicles (AVs) and, more specifically, to devices and methods for maintaining the condition of a fleet of AVs with assistance from AV users.

BACKGROUND

In conventional automobile contexts, drivers maintain the condition of their automobiles. For example, drivers are generally responsible for keeping their own vehicles clean, keeping air in the tires, taking their vehicles to a shop for routine maintenance tasks, etc. In ridesharing contexts, routine maintenance tasks can be performed by drivers, or by operators maintaining a fleet of vehicles used in ridesharing. For example, if a driver uses a personally owned vehicle to offer rides, the driver is responsible for maintaining the vehicle. As another example, if a taxi company provides vehicles to drivers for shifts of time, the taxi company may employ a maintenance staff to clean the taxis between shifts and ensure they are in suitable condition for passengers, with taxi drivers performing routine housekeeping tasks (e.g., removing garbage) between rides.

Driverless AVs can provide rides to users without a human driver present in the AV. Without a human driver, no individual is responsible or available for routine housekeeping and maintenance. In addition, AV servicing and maintenance tasks are increasingly being automated, so that human operators are no longer involved in certain routine servicing and maintenance tasks, such as refueling or recharging. As more tasks become automated, fewer human staff will be present in AV facilities and able to observe vehicle issues, such as cleanliness issues. In addition, as battery technology improves, electric AVs may be able to go longer between charges and, therefore, longer between trips to service facilities where maintenance issues are typically addressed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Automobile drivers generally maintain their vehicles. In rideshare contexts, drivers keep their vehicles safe, functioning, and clean for themselves and their riders. For example, when their automobiles need maintenance, drivers take their automobiles to a shop; when their automobiles need cleaning, drivers clean them. In AV ridesharing contexts, cars providing rideshare services do not have drivers. However, users still expect clean, functioning automobiles. While AVs can be cleaned and monitored at periodic intervals, e.g., when an AV returns to a facility for refueling or storage, AVs do not have a person in the vehicle to observe and correct routine maintenance tasks, as a driver would. For example, if a rider forgets an item in an AV, it may ride around in the AV for hours without a driver or other operator securely storing the item. As another example, if a camera or other sensor of the AV gets dirty, a driver is not available to clean the sensor. External vehicle condition is of greater consequence in the AV context than in non-automated contexts, since obscured sensors can impact performance of the AV.

The vehicle maintenance system described herein relies on users to perform various tasks for the AV, such as cleaning, housekeeping, and minor maintenance. An AV includes one or more sensors for capturing data describing the current state of the AV. For example, the AV may include cameras, radar sensors, lidar sensors, and weight sensors. The vehicle maintenance system receives the captured sensor data and compares the captured sensor data to an expected state of the AV to detect any issues in the AV. As used herein, an expected state for a component of the AV may be a state in which the AV is clean within a certain tolerance and/or properly functioning within a certain tolerance, e.g., a state in which a sensor provides adequately accurate data, or a state in which a vehicle interior meets a tolerable level of cleanliness. The vehicle maintenance system may use various models and/or rules to detect different types of issues in the AV. For example, the vehicle maintenance system compares a weight registered by a weight sensor to one or more thresholds to determine if a passenger may have left an item in the AV. As another example, the vehicle maintenance system compares an image of the interior of the AV to a model trained to classify an interior as clean or dirty to detect garbage left in the AV, or a spill in the AV interior.

In response to detecting an issue, the vehicle maintenance system instructs the user to perform a maintenance task to address the detected issue. For example, if the vehicle maintenance system determines that a previous passenger left an item in the AV, the vehicle maintenance system asks the current user to place the item in a compartment for safekeeping. As another example, if the vehicle maintenance system detects a spill in the AV, the vehicle maintenance system asks the user riding in the AV to clean the spill using cleaning supplies available in the AV. The vehicle maintenance system receives further sensor data and, based on the additional sensor data, verifies that the user has completed the task. For the lost item example, the vehicle maintenance system receives updated weight data describing a weight where the item was left and a weight in the compartment to determine that the user moved the item to the compartment for safekeeping. For the spill example, the vehicle maintenance system receives an updated image or set of images of the interior and classifies the interior as dirty or clean.

The vehicle maintenance system may inform a fleet management system about maintenance tasks requested of the user, and the user's performance of such tasks. The fleet management system may store data describing tasks performed by the user and provide incentives to the user based on tasks performed, e.g., in the form of payment, account credits, discounts, or other rewards. The fleet management system may also use historical task performance data, and/or stated user preference data, to determine whether to surface an issue to a given user. For example, if a user has shown previous interest in performing a certain task, such as interior cleaning, vehicle maintenance systems may continue surfacing such issues to the user; conversely, if the user has ignored requests to perform a given type of task, or all tasks, the fleet management system may instruct a vehicle maintenance system to not surface certain types of issues, or any maintenance issues, to that user. Furthermore, if a user has shown interest in performing a certain task, such as interior deep cleaning or refilling tires, the fleet management system may route an AV to that user when such a task is needed.

User-assisted maintenance of AVs enables the fleet management system to keep the fleet of AVs in good condition even without an in-vehicle driver or operator. Because the quality of work performed by users varies, the vehicle maintenance system ensures that work is performed correctly by verifying that the user has resolved the issue. If the user has not adequately resolved the issue, or is unwilling or unable to resolve the issue, the fleet management system can direct the AV to a facility where an operator can address the issue, or to another user that has exhibited interest and/or skill in performing maintenance tasks. Inviting users to participate in maintenance tasks increases the availability of AVs in the fleet by allowing AVs to stay on-duty when minor maintenance issues arise. Furthermore, user-assisted maintenance can ensure high performance of the AV during a ride. For example, if a sensor becomes dirty or if a tire loses pressure during a ride, it can be preferable from the perspective of both the user and the fleet management system for the user to quickly correct the issue, rather than have the AV proceed with the ride in a reduced state, or have a second AV take over the ride service.

Embodiments of the present disclosure provide a system for AV maintenance including a sensor interface, an issue detector, a user interface (UI) module, and a verification module. The sensor interface is configured to receive data captured by a sensor, the data describing a state of a component of the AV. The issue detector is configured to detect an issue related to the component of the AV based on the data captured by the sensor. The UI module is configured to generate an instruction for a user of the AV for presentation via a user interface, the instruction instructing the user to address the detected issue. The verification module is configured to verify, based on additional data captured by the sensor and describing an updated state of the component of the AV, that the issue related to the component of the AV has been resolved.

Embodiments of the present disclosure also provide for a method for AV maintenance that includes receiving data captured by a sensor, the data describing a state of a component of the AV; detecting an issue related to the component of the AV based on the data captured by the sensor; generating an instruction for a user of the AV for presentation via a user interface, the instruction instructing the user to address the detected issue; receiving additional data captured by the sensor, the additional data describing an updated state of the component of the AV; and verifying, based on the received additional data, that the issue related to the component of the AV has been resolved.

Embodiments of the present disclosure also provide for a system for maintaining a fleet of AVs including a fleet maintenance manager configured to receive, from an AV of the AV fleet, data describing a maintenance issue detected by the AV based on sensor data, and receive, from the AV, a confirmation that a user of the AV attended to and corrected the detected maintenance issue; a user interface module configured to transmit, to a user device, an instruction for the user to correct the detected maintenance issue; and a user database configured to store data associating users of the AV fleet with maintenance issues addressed by the users.

As will be appreciated by one skilled in the art, aspects of the present disclosure, in particular aspects of user-assisted AV maintenance, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Configured for User-Assisted Maintenance

Figure 1:
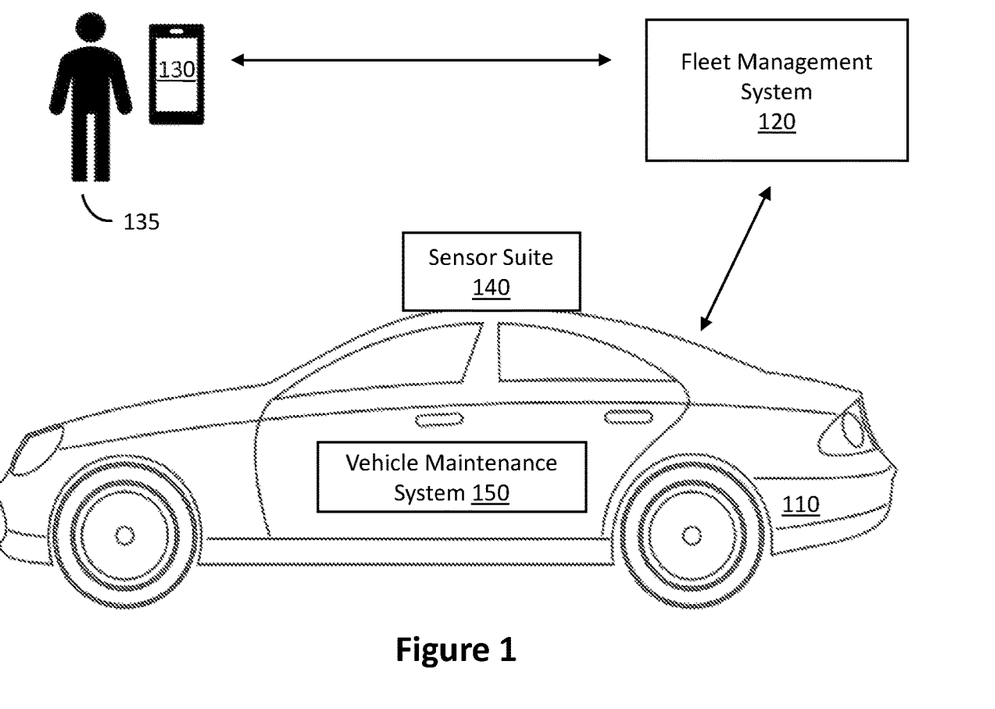
FIG. 1 is a block diagram illustrating a system including an example AV in which user-assisted AV maintenance according to some embodiments of the present disclosure may be implemented.

FIG. 1 is a block diagram illustrating a system 100 including an example AV in which user-assisted AV maintenance according to some embodiments of the present disclosure may be implemented. The system 100 includes an AV 110, a fleet management system 120, and a user device 130. AV 110 includes a sensor suite 140 and a vehicle maintenance system 150. The fleet management system 120 manages a fleet of AVs that are similar to AV 110; the other AVs in the fleet also include a sensor suite and a vehicle maintenance system. The fleet management system 120 receives service requests for the AVs from user devices 130. For example, a user 135 makes a request for a ride in an app executing on the user device 130, which transmits the request to the fleet management system 120. The fleet management system 120 dispatches the AVs to carry out the service requests. The vehicle maintenance system 150 detects maintenance issues in the AV 110 based on data from the sensor suite 140, asks users to assist with addressing the maintenance issues, and verifies that the maintenance issues have been addressed.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include interior and exterior cameras, radar sensors, sonar sensors, lidar sensors, thermal sensors, GPS, wheel speed sensors, inertial measurement units (IMUs), accelerometers, microphones, strain gauges, pressure monitors, barometers, thermometers, altimeters, ambient light sensors, weight sensors, tire pressure sensors, etc. The sensors may be located in various positions in and around the AV 110. For example, the AV 110 may have multiple cameras located at different positions around the AV 110. The sensor suite 140 is described further in relation to FIG. 2.

An onboard computer (not shown in FIG. 1) is connected to the sensor suite 140 and functions to control the AV 110 and to process sensed data from the sensor suite 140 and/or other sensors in order to determine the state of the AV 110. Based upon the vehicle state and programmed instructions, the onboard computer modifies or controls behavior of the AV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The vehicle maintenance system 150 identifies maintenance issues with the AV 110 and, in at least some situations, asks the user to assist with addressing the maintenance issue. The vehicle maintenance system 150 obtains sensor data from one or more sensors of the sensor suite 140 and processes the sensor data to determine whether an aspect of the AV 110 is not in an expected state and has a maintenance issue, e.g., if light interior or exterior cleaning is needed. The vehicle maintenance system 150 may ask or instruct a user of the AV 110 to assist with maintenance of the AV 110. The vehicle maintenance system 150 verifies whether or not the user successfully completes a maintenance task based on additional data from a sensor of the sensor suite 140. The vehicle maintenance system 150 may be implemented by a general-purpose computer adapted for I/O communication with the sensor suite 140 and onboard computer, or may additionally or alternatively be any suitable computing device. The vehicle maintenance system 150 is preferably connected to the Internet via a wireless connection (e.g., via a cellular data connection). Additionally or alternatively, the vehicle maintenance system 150 may be coupled to any number of wireless or wired communication systems. The vehicle maintenance system 150 is described further in relation to FIGS. 3-5.

The fleet management system 120 manages the fleet of AVs, including AV 110. The fleet management system 120 may manage one or more services that provides or uses the AVs, e.g., a service for providing rides to users using the AVs, or a service that delivers items using AVs (e.g., prepared foods, groceries, packages, etc.). The fleet management system 120 selects an AV from a fleet of AVs to perform a particular service or other task, and instructs the selected AV (e.g., AV 110) to drive to a particular location (e.g., an address to pick up a user). The fleet management system 120 also manages fleet maintenance tasks, such as fueling, inspecting, and servicing of the AVs. As shown in FIG. 1, the AV 110 communicates with the fleet management system 120. The AV 110 and fleet management system 120 may connect over a public network, such as the Internet. The fleet management system 120 is described further in relation to FIG. 6.

Example Sensor Suite

Figure 2:
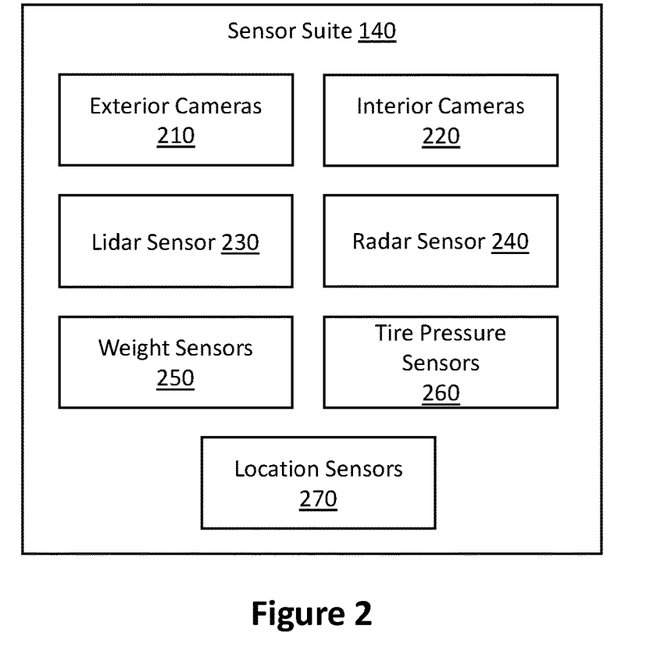
FIG. 2 is a block diagram illustrating a sensor suite according to some embodiments of the present disclosure.

FIG. 2 is a block diagram illustrating the sensor suite 140 according to some embodiments of the present disclosure. The sensor suite 140 includes exterior cameras 210, interior cameras 220, a lidar (light detection and ranging) sensor 230, a radar sensor 240, weight sensors 250, tire pressure sensors 260, and location sensors 270. In alternative configurations, fewer, different and/or additional sensors may be included in the sensor suite 140, e.g., any of the other sensors described in relation to FIG. 1 may be included.

Exterior cameras 210 are configured to capture images of the environment around the AV 110. The sensor suite 140 may include multiple exterior cameras 210 at different locations on the AV 110 to capture different views, e.g., a front-facing camera, a back-facing camera, and side-facing cameras. The exterior cameras 210 may be implemented using high-resolution imagers with either fixed or adjustable mountings, and fixed or adjustable fields of view. A camera controller may instruct the exterior cameras 210 to capture images, and, in some embodiments, may instruct a given exterior camera 210 to zoom in or zoom out, or to pan to a particular field of view. In some embodiments, one or more exterior cameras 210 are positioned to capture a field of view that includes a portion of the AV 110. For example, one or more exterior cameras 210 are positioned to capture images of the license plate or license plates (front and back) of the AV 110. As another example, one or more exterior cameras 210 are positioned to capture images of a windshield of the AV 110.

Interior cameras 220 are configured to capture images of an interior compartment of the AV 110. The sensor suite 140 may include multiple interior cameras 220 at different locations within the AV 110 to capture different views, e.g., views of different seats, or views of different compartments. The interior cameras 220 may have either fixed or adjustable mountings, and fixed or adjustable fields of view. A camera controller may instruct the interior cameras 220 to capture images, and, in some embodiments, may instruct a given interior camera 220 to zoom in or zoom out, or to pan to a particular field of view. In some embodiments, the interior cameras 220 or camera controller are motion sensitive and capture images in response to detecting motion within a given field of view.

The lidar sensor 230 is configured to measure distances to objects in the vicinity of the AV 110 using reflected laser light. The lidar sensor 230 may be a scanning lidar that provides a point-cloud of the region scanned. The lidar sensor 230 may have a dynamically configurable field of view, and a controller may instruct the lidar sensor 230 to capture a point cloud of a particular field of view.

The radar sensor 240 is configured to measure ranges and speeds of objects in the vicinity of the AV 110 using reflected radio waves. The sensor suite 140 may include one or more articulating radar sensors, long-range radar sensors, short-range radar sensors, or some combination thereof. The radar sensor 240 may be implemented using a scanning radar with a dynamically configurable field of view, and a controller may instruct the radar sensor 240 to capture data from a particular field of view.

The exterior cameras 210, interior cameras 220, lidar sensors 230, and radar sensors 240 each capture data describing a field of view of the sensors. Each of these field-of-view sensors can be negatively impacted by material obscuring the field of view. For example, dirt covering the lens or light input of an exterior camera 210, interior camera 220, or lidar sensor 230 can prevent the camera 210 or 220 or lidar sensor 230 from receiving a complete set of data describing its field of view. While radar sensor 240 relies on radio waves rather than light, material on the radar sensor 240 (e.g., dirt or ice) can negatively impact performance of the radar sensor 240.

The weight sensors 250 detect weight of a person or object at various locations within the AV 110. For example, if an interior compartment of the AV 110 has six seats, each seat may include an embedded weight sensor 250 to detect if a person is sitting on the seat. As another example, interior compartments or other locations in which users may place items may have weight sensors to detect if objects are placed on top of the sensors. Each weight sensor 250 may be configured to sense a weight measurement, or to detect if the weight is above or within a given threshold (e.g., above 80 pounds, or between 10 and 50 pounds). The sensitivity and thresholds for different weight sensors 250 may vary; for example, a weight sensor 250 within a storage compartment may obtain be more sensitive and accurate weight measurement than a weight sensor 250 in a seat.

Tire pressure sensors 260 detect air pressure within tires of the AV 110. The tire pressure sensors 260 may be part of a tire-pressure monitoring system (TPMS) for monitoring air pressure inside pneumatic tires. The tire pressure sensors 260 may be physical pressure sensors that directly measure air pressure, or indirect sensors that detect pressure using a software-based system based on other sensor signals, such as wheel speeds, accelerometer data, and driveline data.

Location sensors 270 collect data that is used to determine a current location of the AV 110. The location sensors 270 may include a GPS sensor and one or more IMUs. The location sensors 270 may further include a processing unit (e.g., a module of the onboard computer, or a separate processing unit) that receives signals (e.g., GPS data and IMU data) to determine the current location of the AV 110. The location determined by the location sensors 270 is used for route and maneuver planning. The location may also be used by the vehicle maintenance system 150 and/or fleet management system 120 in determining whether to surface maintenance requests to users, and in determining a place for a user to perform a vehicle maintenance task.

Example Vehicle Maintenance System Use Case—Lost Item

Figure 3:
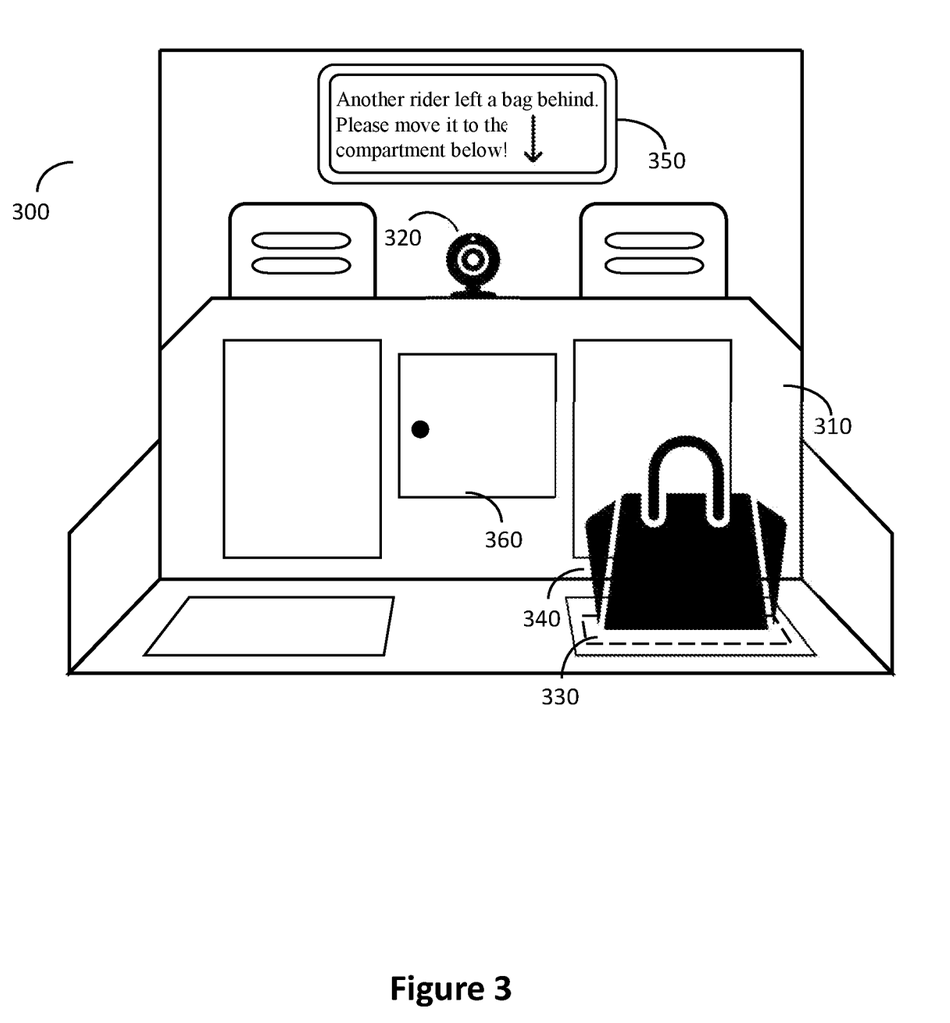
FIG. 3 illustrates an example interior of an AV implementing an example vehicle maintenance system according to some embodiments of the present disclosure.

FIG. 3 illustrates an example interior of an AV implementing the vehicle maintenance system 150. In this example, a passenger compartment 300 of the AV 110 has two rows of seats facing each other. The view shown in FIG.

3 is from the viewpoint of one of the rows of seats, looking towards the other row of seats 310 positioned opposite. The user 135 may see the view shown in FIG. 3 while seated in a seat opposite the row of seats 310.

The passenger compartment 300 includes an interior camera 320. The interior camera 320 is an example of the interior cameras 220 described with respect to FIG. 2. The interior camera 320 is configured to capture a field of view of portion of the passenger compartment 300, e.g., a view looking downwards towards the row of seats 310. In other embodiments, interior cameras 220 may be included near the upper corners of the row of seats 310, on a ceiling of the AV 110, or at one or more other locations. One or more interior cameras 220 may also be positioned on the opposite row of seats; for example, an interior camera on the opposite row of seats may be directed at the row of seats 310.

The row of seats 310 includes weight sensors, including the weight sensor 330 shown in FIG. 3. The weight sensor 330 is an example of the weight sensors 250 described with respect to FIG. 2. In this example, the weight sensor 330 senses the weight of a bag 340 placed on the row of seats 310 and on top of the weight sensor 330.

In this example, the vehicle maintenance system 150 receives sensor data from the interior camera 320 and from the weight sensor 330. Based on the signals from the sensors 320 and 330, the vehicle maintenance system 150 detects a potential issue in the AV 110; in this example, the potential issue is that a passenger left the bag 340 in the AV 110. In particular, the vehicle maintenance system 150 detects the bag 340 based on a signal from the weight sensor 330 indicating that an object is placed on the weight sensor 330. Alternatively or additionally, the vehicle maintenance system 150 compares an image of the row of seats 310 to an expected image of the row of seats 310 (e.g., an image of a clean, empty row of seats) to determine that row of seats 310 is not clean and empty. The vehicle maintenance system 150 may use a classification model or other type of model to determine what is on the seat, e.g., a bag, a box, a spill, garbage, etc.

The vehicle maintenance system 150 may be programmed to check for different types of issues at different times or in response to different triggers. For example, the vehicle maintenance system 150 obtains sensor data from the sensors 320 and 330 and reviews the sensor data for stray items in response to a signal that a user has exited the AV 110 (e.g., an indication that a ride service has ended, an indication that a person is no longer detected in the passenger compartment 300, or a signal that a door has opened and closes).

The vehicle maintenance system 150 may attempt to return the bag 340 to the user who forgot it. For example, the vehicle maintenance system 150 alerts the fleet management system 120, and the fleet management system 120 transmits an alert to a user device of the user who exited the AV that the user should return to the AV 110 to retrieve the bag 340. However, if the user does not respond to the alerts or return to the AV 110 after a certain period of time, the AV 110 may continue to provide service.

If the AV 110 picks up another user while the bag 340 is still in the passenger compartment 300, the vehicle maintenance system 150 generates an instruction for a subsequent user for display on a user device. In this example, the vehicle maintenance system 150 displays the instruction on the in-vehicle screen 350. The in-vehicle screen 350 indicates that the AV 110 has detected the bag 340 and requests for the user to move the bag into the indicated compartment 360 for safekeeping. The door to the compartment 360 may auto- matically lock after the bag 340 has been placed inside so that the bag 340 is safe until it can be returned to the user who left it behind.

Example Vehicle Maintenance System Use Case—Dirty Sensor

Figure 4A:
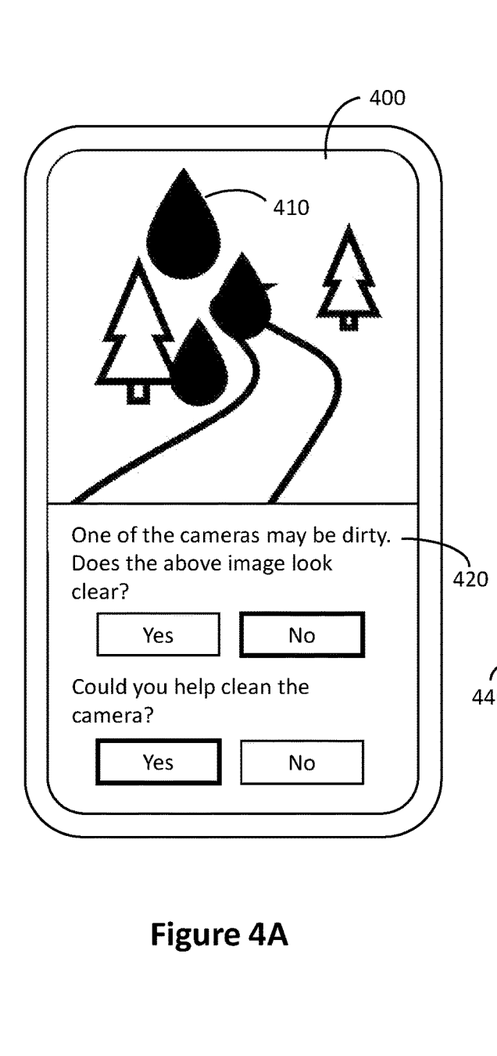
FIGS. 4A and 4B illustrate an example series of user interfaces provided to a user assisting with maintenance of an AV according to some embodiments of the present disclosure.
Figure 4B:
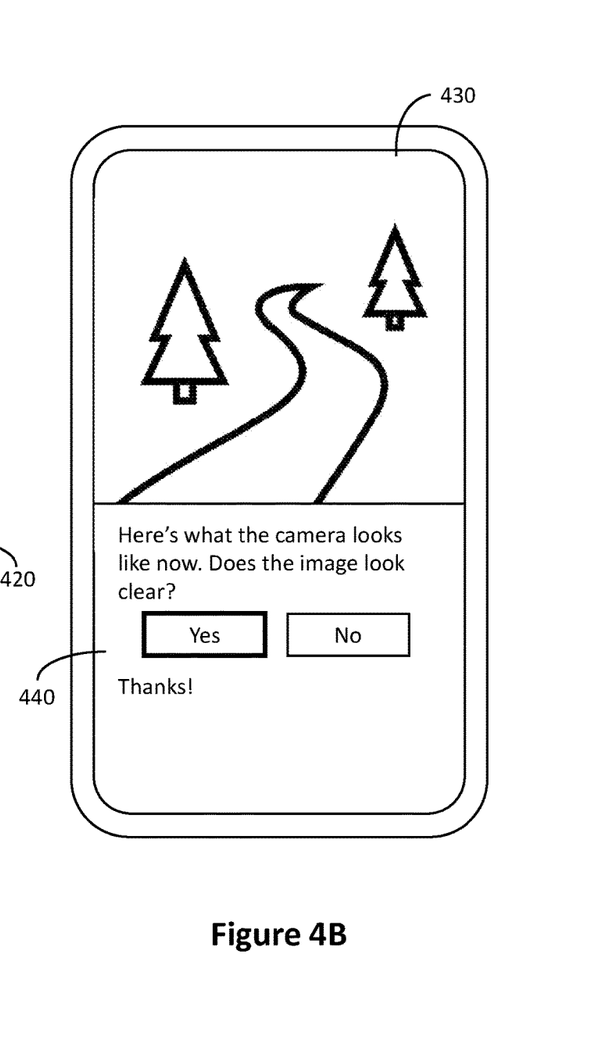

FIGS. 4A and 4B illustrate an example series of user interfaces provided to a user assisting with maintenance of an AV. In this example, the vehicle maintenance system 150 receives sensor data from the sensor suite 140 and determines that one of the exterior cameras 210 may be dirty. The vehicle maintenance system 150 may use rules, a machine-learned model, or other techniques to identify a dirty camera, as described further with respect to FIG. 5.

In response to determining that the exterior camera 210 is dirty, the vehicle maintenance system 150 generates instructions for the user in the AV 110. In this example, the vehicle maintenance system 150 provides instructions to the user via the user device 130. The vehicle maintenance system 150 may connect to the user device 130 over a local network or via the fleet management system 120.

FIG. 4A shows a first example user interface displayed by the user device 130. The user interface includes an image 400 captured by the dirty exterior camera 210. The image 400 includes some mud splatter 410 that was detected by the vehicle maintenance system 150 and that obscures the view of the exterior camera 210. The user interface also includes a series of questions 420 to the user. A first question asks the user to confirm that the camera obtained by the camera is not clear, to which the user has answered NO. This answer may be transmitted to the fleet management system 120 for further training of a model for detecting splatter. In response to the user input indicating that the camera is dirty, the user interface asks the user to help clean the exterior camera 210, to which the user has answered YES.

In response to receiving the user's agreement to clean the camera, the vehicle maintenance system 150 provides additional instructions via the user device 130 detailing how the user can clean the camera. For example, the user interface tells the user where to find cleaning supplies in the AV 110, which camera needs to be cleaned, how to clean the camera, etc. If the AV 110 is moving while the vehicle maintenance system 150 is verifying that the camera is dirty in the interface shown in FIG. 4A, the AV 110 pulls off the road and parks in a safe place for the user to clean the exterior camera 210. The vehicle maintenance system 150 may provide an estimated delay caused by cleaning the camera (i.e., the delay to pull off the road and for the user to perform the cleaning task) to the user in the user interface when asking the user to clean the exterior camera 210. In some embodiments, the fleet management system 120 provides an incentive for the user to clean the camera, e.g., a discount on this ride or a future ride, a ride credit, etc., and the vehicle maintenance system 150 displays the incentive in the user interface when asking the user to clean the exterior camera 210.

The dirty exterior camera, other exterior cameras 210, and/or other sensors (e.g., the lidar sensor 230) may track the movements of the user as the user attempts to clean the dirty exterior camera. After determining that the user has finished cleaning the camera, the vehicle maintenance system 150 transmits a current image 430 to the user device 130 for display, as shown in FIG. 4B. The user device 130 also displays a question 440 asking the user if the image is now clear, after the camera has been clean. In this case, the user has answered YES, indicating that the camera is now clean. In addition to relying on the user input, or instead of receiving the user input, the vehicle maintenance system 150 may verify that the exterior camera 210 is clean, e.g., using rules, a machine-learned model, or other techniques.

Example Vehicle Maintenance System

Figure 5:
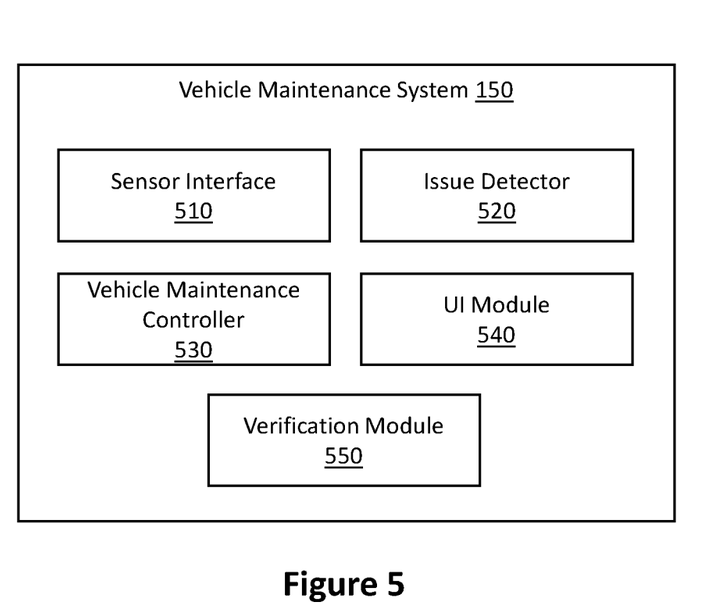
FIG. 5 is a block diagram illustrating a vehicle maintenance system according to some embodiments of the present disclosure.

FIG. 5 is a block diagram illustrating the vehicle maintenance system 150 according to some embodiments of the present disclosure. The vehicle maintenance system 150 includes a sensor interface 510, an issue detector 520, a vehicle maintenance controller 530, a user interface (UI) module 540, and a verification module 550. In alternative configurations, fewer, different and/or additional components may be included in the vehicle maintenance system 150. Further, functionality attributed to one component of the vehicle maintenance system 150 may be accomplished by a different component included in the vehicle maintenance system 150 or a different system than those illustrated. For example, in some embodiments, some elements of the vehicle maintenance system 150 (e.g., the UI module 540) may be implemented by the fleet management system 120, or by another device.

The sensor interface 510 includes one or more interfaces to sensors of the sensor suite 140, e.g., the sensors described with respect to FIG. 2. The sensor interface 510 may request data from the sensor suite 140, e.g., by requesting that a sensor capture data in a particular direction or at a particular time, or requesting that a sensor provide data at a particular time. The sensor interface 510 is configured to receive data captured by at least one sensor of the sensor suite 140.

The issue detector 520 receives sensor data from the sensor interface 510 and processes the sensor data to detect issues in the AV 110 or with AV components. The issue detector 520 may use various rules, models, expected data sets, or other techniques to identify anomalies in sensor data. The issue detector 520 may be configured to determine if the sensor data indicates that a component or portion of the AV is not in its expected state, e.g., if a sensor is not receiving expected data, or if a particular portion or component of the AV 110 does not have an expected appearance. In some embodiments, the issue detector 520 is configured to detect a specific issue with a component of the AV 110, e.g., if a sensor is dirty, or if an AV seat has a lost item, garbage, or a spill on it. In some embodiments, the issue detector 520 retrieves a machine-learned model trained to detect an issue in a given component or portion of the AV 110 based on sensor data, and the issue detector 520 uses the machine-learned model to determine that a component of the AV 110 is exhibiting the issue. The machine-learned model may be trained based on data captured by similar AV sensors, as described with respect to FIG. 6.

The issue detector 520 is configured to look for various types of issues depending on the sensor data received. The issue detector 520 may process data from the AV sensors that are used to monitor the environment of the AV 110 during autonomous driving (e.g., the exterior cameras 210, lidar sensors 230, and radar sensors 240) to determine if any of these sensors are obstructed or partially obstructed. For example, if the issue detector 520 determines that a portion of an image or a portion of a point cloud captured by a given AV sensor do not change over time as the AV 110 moves, this may indicate that this portion is obstructed by dirt or other material.

The issue detector 520 may process data from the interior cameras 220 and/or weight sensors 250 to determine if items have been left in the AV 110, as described with respect to FIG. 3. The issue detector 520 may also process data from the interior cameras 220 to identify other interior issues, such as garbage, crumbs, or spills, in the interior, broken seat belts, broken door handles, ripped seat fabric, etc. For example, the issue detector 520 retrieves a machine-learned model that is trained based on images of one or more AV interiors with an expected appearance, and images of AV interiors exhibiting one or more issues. The machine-learned model is trained to determine if the data from the interior cameras 220 meets or does not meet the expected appearance of the AV interior. The machine-learned model may further be trained to detect one or more particular issues within the AV interior based on interior camera data.

The issue detector 520 may process tire pressure data from the tire pressure sensors 260 to determine if a tire of the AV 110 has low pressure. For example, the issue detector 520 compares received tire pressures to one or more threshold tire pressure. The issue detector 520 may process data from exterior cameras 210 with a field of view directed at the AV 110 to identify various external issues on the AV 110. For example, one exterior camera 210 provides an image of the license plate, and the issue detector 520 determines if the license plate is obscured by performing text detection on the license plate, or by comparing the image to an expected image or a model. As another example, another exterior camera 210 provides an image of a windshield, and the issue detector 520 determines if the windshield has debris, dirt, ice, or other issues, by comparing the image to an expected image or a model. It should be understood that these examples issues and sensor data are merely exemplary, and the issue detector 520 may be programmed to detect additional or alternative types of issues, to detect issues based on additional or alternative types of sensor data, and to detect issues based on additional or alternative detection rules or techniques.

The issue detector 520 may look for issues in the AV at certain times or intervals. For example, the issue detector 520 may check that AV sensors of the sensor suite 140 are operating and not obstructed at regular intervals (e.g., every 10 seconds, or every minute) while the AV 110 is operating. As another example, the issue detector 520 checks for garbage or lost items after a rider exits the AV 110.

The vehicle maintenance controller 530 receives data from the issue detector 520 indicating any detected issues in the AV 110. The vehicle maintenance controller 530 determines whether to surface a detected issue to a user based on one or more factors, such as the type of issue, the severity of the issue, the capabilities and interests of the user, the location of the AV 110, and the planned use of the AV 110. The vehicle maintenance controller 530 may consider or balance various factors in determining whether to surface a maintenance request to a user.

Some maintenance issues can be considered functional issues, such as sensor obstructions and low tire pressure, and other maintenance issues can be considered comfort issues, such as housekeeping issues in the passenger compartment. For functional issues that impact performance of the AV 110, the vehicle maintenance controller 530 may automatically surface the issue. In some embodiments, the vehicle maintenance controller 530 determines whether to surface a functional issue based on the severity of the issue. For example, the vehicle maintenance controller 530 determines to surface a tire pressure issue if the tire pressure is below a certain threshold that is unsafe, causes a highly degraded ride, and/or may lead to wheel damage; the vehicle maintenance controller 530 may or may not surface the tire pressure issue if the tire pressure is at a tolerable level for the AV 110 to continue driving for a prolonged period, or until the AV 110 is next scheduled for service. As another example, the vehicle maintenance controller 530 determines to surface a sensor issue if a sensor or set of sensors are so obstructed as to reduce AV functionality; the vehicle maintenance controller 530 may or may not surface the sensor issue if visibility of the other sensors is sufficient for AV functionality to be unimpacted (e.g., if one exterior camera 210 is obstructed, but another camera or combination of exterior cameras capture the same field of view).

For minor functional issues and comfort issues, the vehicle maintenance controller 530 may determine to surface issues based on expressed and inferred preferences of the user. A user may provide information to the fleet management system 120 describing the user's willingness to assist with maintenance, including the capabilities of the user (is or is not able to change a tire, add air to tires, clean sensors, etc.). In addition, as vehicle maintenance systems 150 surface maintenance requests to users, the vehicle maintenance controllers 530 and fleet management system 120 track users' responses to determine the willingness of the user to perform maintenance tasks generally and/or to perform specific types of maintenance requests. When the issue detector 520 detects an issue, the vehicle maintenance controller 530 retrieves user data describing the user of the AV 110 collected by the fleet management system 120 based on previous responses to maintenance requests and/or expressed preferences and determines whether to surface the detected issue based on the retrieved user data and the detected issue. For example, if the user data indicates that the user is willing to help with sensor cleaning, but is not willing to help with interior cleaning, the vehicle maintenance controller 530 determines to surface a request to clean an exterior camera 210, and determines not to surface a request to remove garbage from the AV interior.

The vehicle maintenance controller 530 may determine whether to surface an issue based on additional factors, such as the location of the AV 110 determined by the location sensors 270, or a planned usage of the AV 110. For example, if the AV 110 is located far away from potential replacement AVs and/or a maintenance facility, the vehicle maintenance controller 530 may surface more complex or arduous tasks, such as changing a tire or putting on snow chains. By contrast, if a potential replacement AV is nearby, the fleet management system 120 may opt to send a replacement AV and return the AV 110 to a maintenance facility rather than surface the task to a user. As another example, if the vehicle maintenance controller 530 determines that the AV 110 is soon returning to an AV facility for fueling, storage, or other reasons, the vehicle maintenance controller 530 may determine not to surface an issue, and have the issue addressed at the facility instead.

If the vehicle maintenance controller 530 decides to surface an issue, the vehicle maintenance controller 530 transmits information describing the issue to the UI module 540. The UI module 540 provides a user interface to the user that describes a detected issue and provides instructions for the user to perform a task to address the detected issue. The UI module 540 may generate a user interface for display on an in-vehicle interface, such as the in-vehicle screen 350 shown in FIG. 3. In another example, the UI module 540 provides information and/or instructions via a speaker in the AV 110. In some embodiments, the UI module 540 provides a user interface, or data for a user interface, for display on a personal device of the user, such as user device 130. In some embodiments, the UI module 540 may use a combination of user devices; for example, the UI module 540 surfaces an issue related to an AV sensor for the user on the in-vehicle screen 350, and in response to the user agreeing to clean the AV sensor, the UI module 540 generates instructions for presentation on the user's personal device 130, which the user can refer to while the user is outside the AV 110 while cleaning the sensor.

As described with respect to the example use cases shown in FIGS. 3, 4A, and 4B, the UI module 540 may ask a user to confirm a detected issue, provide visual information about a detected issue to a user, ask a user to perform a task addressing the detected issue, provide instructions for performing the task, and ask the user to verify that the task is complete. The UI module 540 may provide additional instructions, questions, and information to the user related to maintenance tasks. For example, the UI module 540 provides an interface in which a user can report issues, such as a broken seatbelt, a smell, a spill, a broken window controller, etc. As another example, the UI module 540 may ask a user to describe an issue in greater detail, e.g., for the user to identify a stray item in the AV 110 as garbage or a personal item. The vehicle maintenance controller 530 can transmit the reported issues to the fleet management system 120 so that the issues may be addressed, and/or to improve training of models for detecting issues.

The verification module 550 verifies that the user has resolved a detected issue surfaced to the user. The verification module 550 receives additional data from the sensor interface 510 and processes the additional data to determine if the issue is no longer detected. In some embodiments, the verification module uses the issue detector 520 to verify that the issue is resolved. In particular, the issue detector 520 processes the additional sensor data to detect the previously detected issue and indicates to the verification module 550 whether or not the issue detector 520 has detected the issue based on the additional sensor data. If the issue detector 520 no longer detects the issue in the additional data, the verification module 550 determines that the issue has been resolved.

In some embodiments, the verification module 550 may alternatively or additionally track the actions of the user after surfacing the issue to the user. The verification module 550 tracks the movements of the user based on data captured by the interior cameras 220 or, if the user exits the AV 110 to perform a maintenance task, data captured by exterior sensors (exterior cameras 210, lidar sensor 230, and/or radar sensor 240). For example, the verification module 550 tracks the movements of the user to make sure that the user places a lost item in the designated compartment, rather than taking the lost item. As another example, the verification module 550 may receive a signal from a weight sensor in a storage compartment to verify that the lost item has been placed in the storage compartment.

The verification module 550 may request information from the user or instruct additional actions to be taken by the user to assist in verifying that the user successfully completed the task and the issue has been resolved. For example, as shown in FIG. 4B, the verification module 550 instructs the UI module 540 to have the user confirm that the camera has a clear field of view. As another example for verifying that a sensor has been cleaned, the verification module 550 instructs the UI module 540 to generate an instruction for a user to move in front of a field of view of the AV sensor. The verification module 550 then verifies that the AV sensor has been cleaned by determining that the user is visible to the AV sensor while the user is standing in front of the AV sensor. In some embodiments, the UI module 540 requests that the user confirm when the user is standing in front of the AV sensor, or instructs the user to make a particular movement or series of movements in front of the AV sensor to confirm that the AV sensor is operating properly.

In response to the verification module 550 verifying that the user has resolved the issue, the verification module 550 or the vehicle maintenance controller 530 transmit data describing the detected issue and indicating that the user resolved the detected issue to the fleet management system 120. The fleet management system 120 may provide incentives to the user based on the successful resolution of the issue, such as an account credit or discount.

Example Fleet Management System

Figure 6:
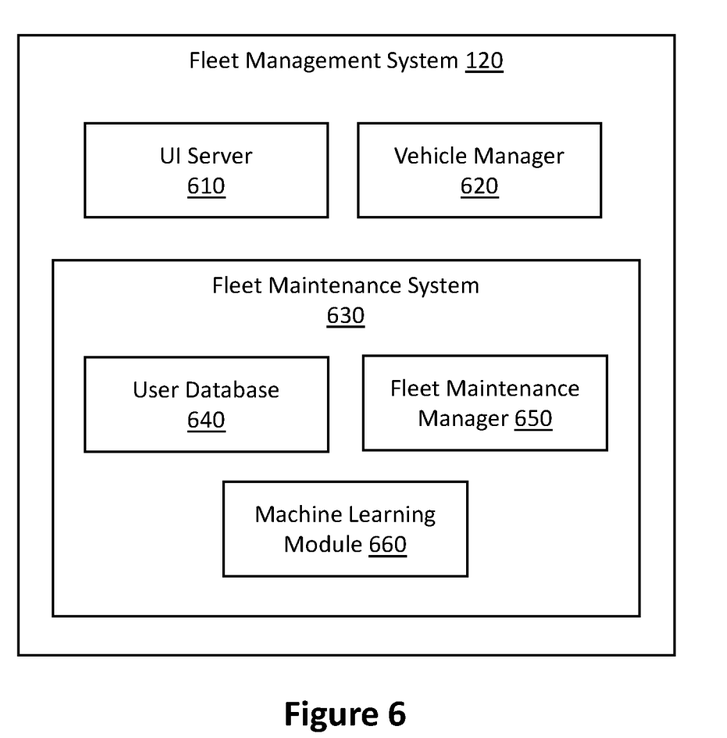
FIG. 6 is a block diagram illustrating a fleet management system according to some embodiments of the present disclosure.

FIG. 6 is a block diagram illustrating the fleet management system 120 according to some embodiments of the present disclosure. The fleet management system 120 includes a UI (user interface) server 610, a vehicle manager 620, and a fleet maintenance system 630. The fleet maintenance system 630 includes a user database 640, a fleet maintenance manager 650, and a machine learning module 660. In alternative configurations, different and/or additional components may be included in the fleet management system 120. Further, functionality attributed to one component of the fleet management system 120 may be accomplished by a different component included in the fleet management system 120 or a different system than those illustrated.

The UI server 610 is configured to communicate with client devices that provide a user interface to users. For example, the UI server 610 may be a web server that provides a browser-based application to client devices, or the UI server 610 may be a mobile app server that interfaces with a mobile app installed on client devices. The user interface enables the user to access a service of the fleet management system 120, e.g., to request a ride from an AV 110, or to request a delivery from an AV 110. The UI server 610 may provide a user interface for receiving reports of maintenance issues from users, requesting help from users with maintenance issues, and verifying completion of maintenance tasks, such as the user interfaces described above. In particular, the UI server 610 may enable communications between the AV 110 (e.g., the vehicle maintenance system 150) and a user device 130. The UI server 610 may receive data from the UI module 540 for inclusion in a user interface provided by the UI server 610. Alternatively, the UI module 540 may be incorporated into the UI module 610.

The vehicle manager 620 manages and communicates with a fleet of AVs, including AV 110. The vehicle manager 620 may assign the AV 110 to various tasks and direct the movements of the AV 110 and other AVs in the fleet. For example, the vehicle manager 620 assigns an AV 110 to perform a service requested by a user to the UI server 610. The vehicle manager 620 may instruct the AV 110 to drive to other locations while not servicing a user, e.g., to improve geographic distribution of the fleet, to anticipate demand at particular locations, etc. The vehicle manager 620 also instructs the AV 110 to return to an AV facility for fueling, inspection, maintenance, or storage.

The fleet maintenance system 630 manages maintenance of the fleet of AVs, and, in particular, manages user-assisted maintenance of the AV 110. The fleet maintenance system 630 may also manage maintenance performed by operators associated with the fleet management system 120 or vehicle maintenance facilities, or automated maintenance performed at maintenance facilities. In some embodiments, the fleet maintenance system 630 manages a user incentive system that incentivizes users to perform maintenance tasks, e.g., by providing credits, discounts, or other rewards to users who successfully complete maintenance tasks.

The user database 640 stores data describing users' willingness towards and aptitude for performing various maintenance tasks. The user database 640 may store explicit preference information entered by the user on the user device 130 and received by the UI server 610 describing whether the user is willing to assist with maintenance, and if so, what types of tasks the user is willing to perform. In addition, as AVs surface maintenance requests to users, the vehicle maintenance controllers provide users' responses to the requests to the fleet maintenance system 630, which the fleet maintenance system 630 stores in the user database 640. The historical response data can be used to determine the helpfulness of the user with respect to maintenance tasks generally and/or specific types of maintenance tasks. In addition, the vehicle maintenance controllers can indicate whether the users successfully completed maintenance tasks, and the fleet maintenance system 630 stores data describing the skill level of users with respect to maintenance tasks. As described with respect to FIG. 5, data from the user database 640 can be provided to the AV 110 so the AV 110 can determine whether to surface an issue to a user.

The fleet maintenance manager 650 manages user-assisted maintenance of the fleet of AVs. The fleet maintenance manager 650 receives data describing detected maintenance issues from the AVs, e.g., from the vehicle maintenance controller 530. The fleet maintenance manager 650 also receives data describing whether the maintenance issues have been resolved by users of the AVs, e.g., from the vehicle maintenance controller 530. The fleet maintenance manager 650 directs data describing tasks refused by users, attempted and successfully completed by users, and tasks unsuccessfully completed by users to the user database 640, which stores the task attempt and completion data, as described above. The fleet maintenance manager 650 also maintains data describing outstanding maintenance issues through the AV fleet. The fleet maintenance manager 650 may also receive, via the UI server 610, user input relating to issues, including whether a user agrees to help with a maintenance task, whether the user verifies that a task is complete, and any issues reported by the user.

If a maintenance issue is recognized by the AV 110 or reported by a user, and the user cannot or does not fully address the issue, the fleet maintenance manager 650 provides data describing the outstanding maintenance issue to the vehicle manager 620. In response, the vehicle manager may direct the AV 110 to drive to a maintenance facility. In some embodiments, the fleet maintenance manager 650 and/or the vehicle manager 620 may select another user to direct the AV 110 to. For example, a user can request to receive rides from vehicles that need maintenance, and the fleet management system 120 can provide a discount on the user's ride or another type of promotion in exchange for the user performing a maintenance task during the ride. More generally, the vehicle manager 620 can use user helpfulness in maintenance tasks, as indicated by the data in the user database 640, as a criteria for pairing user ride requests with AVs. For example, if the fleet maintenance manager 650 reports to the vehicle manager 620 that a vehicle has an obstructed sensor, and the vehicle manager 620 receives a request for a ride from a user who has previously agreed to clean sensors and has done so successfully, the vehicle manager 620 instructs that vehicle to provide a ride to that user.

The machine learning module 660 trains one or more models for detecting issues in the AV 110 based on received data from the sensor suite 140. The machine learning module 660 may train a classification model to classify sensor data as exhibiting a maintenance issue or not exhibiting a maintenance issue. For example, one classification model classifies point clouds received from the lidar sensor 230 as representing a lidar sensor in its expected, unobstructed state, or if the point cloud represents a lidar sensor in an unexpected state (e.g., dirty or obstructed). Another classification model classifies images received of an AV interior as representing an expected state of the interior or an unexpected state. In one embodiment, a multi-class classification model is trained to identify multiple potential issues in an AV interior based on images of the interior, e.g., stains, spills, lost items, garbage, etc. In another embodiments, different machine-learned models are trained to identify different issues from a similar set of sensor data, e.g., one model is trained to recognize spills, and another model is trained to recognize items. The machine learning module 660 trains the machine-learning models based on labeled sensor data received from AVs, such as AV 110. The labels may be generated based on user input, e.g., user-supplied identifications of issues in vehicle interiors (e.g., garbage, spill, stain, or lost item), and user-supplied determinations of whether the user has resolved an issue. The model or models trained by the machine learning module 660 can also be used to verify successful completion of a maintenance task, as described with respect to FIG. 5.

Example Method for User-Assisted AV Maintenance

Figure 7:
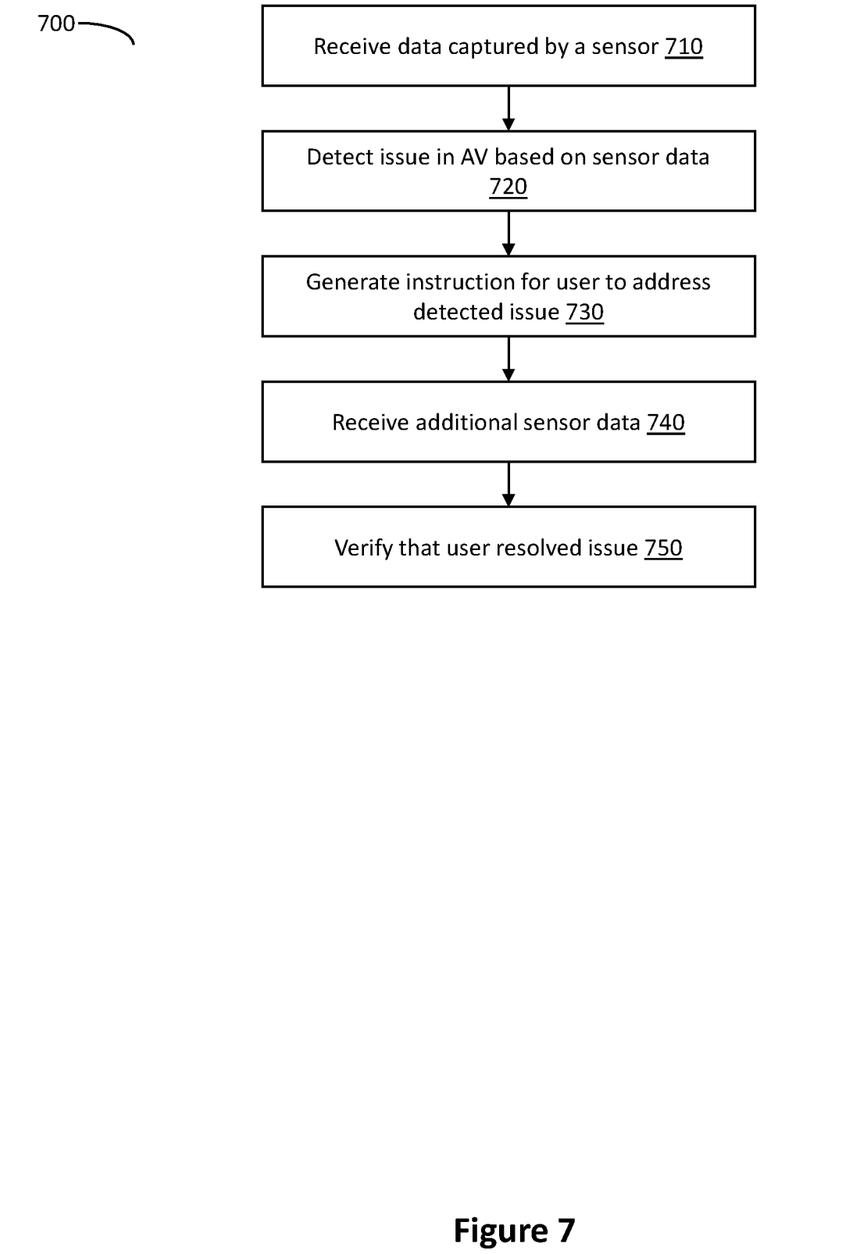
FIG. 7 is a flowchart of an example method for maintaining an AV according to some embodiments of the present disclosure.

FIG. 7 is a flowchart of an example method for user-assisted AV maintenance according to some embodiments of the present disclosure. The vehicle maintenance system 150 (e.g., sensor interface 510) receives 710 data captured by an AV sensor, such as any of the sensors described in FIG. 2. The data captured by the sensor describes a state of a component of the AV 110. In some examples, the data describes a state of the sensor itself, e.g., whether a camera or lidar has an obscured field of view or not. In other examples, the data describes a state of another component, e.g., the state of a vehicle interior, a license plate, a tire, etc.

The vehicle maintenance system 150 (e.g., issue detector 520) detects 720 an issue in the AV based on the sensor data. For example, the vehicle maintenance system 150 compares the sensor data to one or more thresholds, or inputs the sensor data to a machine-learned model. The vehicle maintenance system 150 (e.g., UI module 540) generates 730 an instruction for a user to address the detected issue. The instruction may be provided to the user on an in-vehicle interface or on a personal device of the user.

The vehicle maintenance system 150 (e.g., sensor interface 510) receives 740 additional sensor data. The additional sensor data describes an updated state of the component of the AV 110 after the user has followed the instruction previously provided. The vehicle maintenance system 150 (e.g., verification module 550) verifies 750 that the user has resolved the issue based on the additional sensor data. For example, the verification module 550 may use the same thresholds, machine-learned model, or other issue-detection technique used at step 720 to verify that the issue has been resolved.

SELECT EXAMPLES

Example 1 provides a system for AV maintenance including a sensor interface, an issue detector, a UI module, and a verification module. The sensor interface is configured to receive data captured by a sensor, the data describing a state of a component of the AV. The issue detector is configured to detect an issue related to the component of the AV based on the data captured by the sensor. The UI module is configured to generate an instruction for a user of the AV for presentation via a user interface, the instruction instructing the user to address the detected issue. The verification module is configured to verify, based on additional data captured by the sensor and describing an updated state of the component of the AV, that the issue related to the component of the AV has been resolved.

Example 2 provides the system of according to example 1, where the issue detector is further configure to retrieve a machine-learned model for detecting the issue, the machine-learned model trained to detect the issue related to the component based on data captured by a plurality of sensors similar to the sensor; and determine, using the machine-learned model, that the component of the AV is exhibiting the issue.

Example 3 provides the system according to example 2, where the sensor is a camera configured to capture an image of a portion of the AV, and the machine-learned model is configured to determine whether the portion of the AV is in its expected state or an unexpected state.

Example 4 provides the system according to example 2 or 3, where the verification module is configured to user the machine-learned model to determine that the additional data captured by the sensor does not indicate an issue with the component of the AV.

Example 5 provides the system according example 1, where the sensor is a sensor configured to monitor an environment of the AV and capture data used by the AV for autonomous driving, the detected issue is an obscuring of at least a portion of a field of view of the sensor, and the instruction for the user of the AV includes an instruction to remove material obscuring the sensor from the sensor.

Example 6 provides the system according to example 5, where the UI module is further configured to generate, in the instruction for the user, a visual representation of the field of view of the sensor, the visual representation showing the obscuring of the at least a portion of the field of view; and generate a second instruction for the user, the second instruction including an updated visual representation of the field of view of the sensor, the updated visual representation based on the additional data captured by the sensor, and the second instruction further including a request for the user to indicate whether the field of view is no longer obscured.

Example 7 provides the system according to example 5 or 6, where the UI module is further configured to generate an additional instruction for the user to move to a position within the field of view of the sensor, and the verification module is further configured to verify that the user is visible to the sensor in the field of view.

Example 8 provides the system according to any of the preceding examples, the system further including a vehicle maintenance controller configured to retrieve user data describing the user of the AV, the user data based on responses of the user to previous instructions provided to the user to address AV issues; and determine, based on the retrieved user data and the detected issue, to surface the instruction to the user.

Example 9 provides a method for AV maintenance that includes receiving data captured by a sensor, the data describing a state of a component of the AV; detecting an issue related to the component of the AV based on the data captured by the sensor; generating an instruction for a user of the AV for presentation via a user interface, the instruction instructing the user to address the detected issue; receiving additional data captured by the sensor, the additional data describing an updated state of the component of the AV; and verifying, based on the received additional data, that the issue related to the component of the AV has been resolved.

Example 10 provides the method according to example 9, where detecting an issue related to the component of the AV based on the data captured by the sensor includes retrieving a machine-learned model for detecting the issue, the machine-learned model trained to identify the issue related to the component based on data captured by a plurality of sensors similar to the sensor; and determining, using the machine-learned model, that the component of the AV is exhibiting the issue.

Example 11 provides the method according to example 10, where the sensor is a camera configured to capture an image of a portion of the AV, and the machine-learned model determines whether the portion of the AV is in its expected state or an unexpected state.

Example 12 provides the method according to example 10 or 11, where verifying that the issue related to the component of the AV has been resolved includes determining, using the machine-learned model, that the additional data captured by the sensor does not indicate an issue with the component of the AV.

Example 13 provides the method according to example 9, where the sensor is a sensor configured to monitor an environment of the AV and capture data used by the AV for autonomous driving, the detected issue is an obscuring of at least a portion of a field of view of the sensor, and the instruction for the user of the AV includes an instruction to remove material obscuring the sensor from the sensor.

Example 14 provides the method according to example 13, where the instruction for the user includes a visual representation of the field of view of the sensor, the visual representation showing the obscuring of the at least a portion of the field of view, and the method further includes generating an updated visual representation of the field of view of the sensor, the updated visual representation based on the additional data captured by the sensor; and receiving from the user, via a user interface, an indication that the field of view is no longer obscured.

Example 15 provides the method according to example 13 or 14, where the method further includes generating an additional instruction for the user to move to a position within the field of view of the sensor, and verifying that the issue related to the component of the AV has been resolved includes verifying that the user is visible to the sensor in the field of view.

Example 16 provides the method according to any of examples 9 through 15, where the method further includes retrieving user data describing the user of the AV, the user data based on responses of the user to previous instructions provided to the user to address AV issues, and determining, based on the retrieved user data and the detected issue, to surface the instruction to the user.

Example 17 provides a system for maintaining a fleet of AVs including a fleet maintenance manager configured to receive, from an AV of the AV fleet, data describing a maintenance issue detected by the AV based on sensor data, and receive, from the AV, a confirmation that a user of the AV attended to and corrected the detected maintenance issue; a user interface module configured to transmit, to a user device, an instruction for the user to correct the detected maintenance issue; and a user database configured to store data associating users of the AV fleet with maintenance issues addressed by the users.

Example 18 provides the system according to example 17, further including a machine-learning module configured to receive sensor data from a plurality of AVs in the fleet of AVs; receive labels associated with the sensor data, the labels provided by users in the plurality of AVs and describing the maintenance issue in the plurality of AVs; and train a model to identify the maintenance issue based on the sensor data and associated labels.

Example 19 provides the system according to example 17 or 18, further including a vehicle manager configured to retrieve, from the user database, data describing previous responses of the user to previous instructions provided to the user to address maintenance issues; and determine, based on the retrieved user data and the detected maintenance issue, to route the AV to the user.

Example 20 provides the system according to any of examples 17 through 19, where the fleet maintenance manager is further configured to assign an incentive to the user in response to the confirmation that the user of the AV attended to and corrected the detected maintenance issue.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for autonomous vehicle (AV) maintenance comprising:
    a sensor interface configured to receive data captured by a sensor, the data describing a state of a component of the AV;
    an issue detector configured to detect an issue related to the component of the AV based on the data captured by the sensor;
    a vehicle maintenance controller configured to:
        retrieve user data describing a user of the AV, the user data based on a response of the user to a previous request to the user to address a previous issue; and
        determine, based on the retrieved user data and the detected issue, to surface an instruction to the user to address the detected issue;
    a user interface (UI) module configured to generate the instruction for the user of the AV for presentation via a user interface; and
    a verification module configured to verify, based on additional data captured by the sensor and describing an updated state of the component of the AV, that the issue related to the component of the AV has been resolved.

2. The system of claim 1, wherein the issue detector is further configured to:
    retrieve a machine-learned model for detecting the issue, the machine-learned model trained to detect the issue related to the component based on data captured by a plurality of sensors similar to the sensor; and
    determine, using the machine-learned model, that the component of the AV is exhibiting the issue.

3. The system of claim 2, wherein the sensor is a camera configured to capture an image of a portion of the AV, and the machine-learned model is configured to determine whether the portion of the AV is in its expected state or an unexpected state.

4. The system of claim 2, wherein the verification module is configured to use the machine-learned model to determine that the additional data captured by the sensor does not indicate an issue with the component of the AV.

5. The system of claim 1, wherein the sensor is a sensor configured to monitor an environment of the AV and capture data used by the AV for autonomous driving, the detected issue is an obscuring of at least a portion of a field of view of the sensor, and the instruction for the user of the AV comprises an instruction to remove material obscuring the sensor from the sensor.

6. The system of claim 5, wherein the UI module further configured to:
    generate, in the instruction for the user, a visual representation of the field of view of the sensor, the visual representation showing the obscuring of the at least a portion of the field of view; and
    generate a second instruction for the user, the second instruction comprising an updated visual representation of the field of view of the sensor, the updated visual representation based on the additional data captured by the sensor, and the second instruction further comprising a request for the user to indicate whether the field of view is no longer obscured.

7. The system of claim 5, wherein the UI module is further configured to generate a second instruction for the user to move to a position within the field of view of the sensor, and the verification module is further configured to verify that the user is visible to the sensor in the field of view.

8. A method for autonomous vehicle (AV) maintenance comprising:
    receiving data captured by a sensor, the data describing a state of a component of the AV;
    detecting an issue related to the component of the AV based on the data captured by the sensor;
    retrieving user data describing a user of the AV, the user data based on a response of the user to a previous request to the user to address a previous issue;
    determining, based on the retrieved user data and the detected issue, to surface an instruction to the user to address the detected issue;
    generating the instruction for the user of the AV for presentation via a user interface;
    receiving additional data captured by the sensor, the additional data describing an updated state of the component of the AV; and
    verifying, based on the received additional data, that the issue related to the component of the AV has been resolved.

9. The method of claim 8, wherein detecting an issue related to the component of the AV based on the data captured by the sensor comprises:
    retrieving a machine-learned model for detecting the issue, the machine-learned model trained to identify the issue related to the component based on data captured by a plurality of sensors similar to the sensor; and
    determining, using the machine-learned model, that the component of the AV is exhibiting the issue.

10. The method of claim 9, wherein the sensor is a camera configured to capture an image of a portion of the AV, and the machine-learned model determines whether the portion of the AV is in its expected state or an unexpected state.

11. The method of claim 9, wherein verifying that the issue related to the component of the AV has been resolved comprises determining, using the machine-learned model, that the additional data captured by the sensor does not indicate an issue with the component of the AV.

12. The method of claim 8, wherein the sensor is a sensor configured to monitor an environment of the AV and capture data used by the AV for autonomous driving, the detected issue is an obscuring of at least a portion of a field of view of the sensor, and the instruction for the user of the AV comprises an instruction to remove material obscuring the sensor from the sensor.

13. The method of claim 12, wherein the instruction for the user comprises a visual representation of the field of view of the sensor, the visual representation showing the obscuring of the at least a portion of the field of view, the method further comprising:
generating an updated visual representation of the field of view of the sensor, the updated visual representation based on the additional data captured by the sensor; and
receiving from the user, via the user interface, an indication that the field of view is no longer obscured.

14. The method of claim 12, further comprising generating a second instruction for the user to move to a position within the field of view of the sensor, wherein verifying that the issue related to the component of the AV has been resolved comprises verifying that the user is visible to the sensor in the field of view.

15. The method of claim 8, wherein the user data indicates whether the user completed a previous a maintenance task related to the previous request.

16. The method of claim 8, wherein the user data indicates whether the user agreed to perform a maintenance task related to the previous request.

17. A system for maintaining a fleet of autonomous vehicles (AVs), the system comprising:
a fleet maintenance manager configured to:
receive, from an AV of the AV fleet, data describing a maintenance issue detected by the AV based on sensor data;
receive, from the AV, a confirmation that a user of the AV attended to and corrected the detected maintenance issue;
a vehicle maintenance controller configured to:
retrieve user data describing the user of the AV, the user data based on a response of the user to a previous request to the user to address a previous maintenance issue; and
determine, based on the retrieved user data and the detected issue, to surface an instruction to the user to address the detected issue;
a user interface module configured to transmit, to a user device, the instruction for the user to correct the detected maintenance issue; and
a user database configured to store data associating users of the AV fleet with maintenance issues addressed by the users.

18. The system of claim 17, further comprising a machine-learning module configured to:
receive sensor data from a plurality of AVs in the fleet of AVs;
receive labels associated with the sensor data, the labels provided by users in the plurality of AVs and describing maintenance issues observed by the users in the plurality of AVs; and
train a model to identify a particular maintenance issue based on the sensor data and associated labels.

19. The system of claim 17, further comprising a vehicle manager configured to:
retrieve, from the user database, data describing previous responses of the user to previous instructions provided to the user to address maintenance issues; and
determine, based on the retrieved user data and the detected maintenance issue, to route the AV to the user.

20. The system of claim 17, wherein the fleet maintenance manager is further configured to assign an incentive to the user in response to the confirmation that the user of the AV attended to and corrected the detected maintenance issue.

* * * * *